United States Patent
Saito et al.

(10) Patent No.: US 10,457,815 B2
(45) Date of Patent: Oct. 29, 2019

(54) CURABLE RESIN COMPOSITION

(71) Applicant: AGC Inc., Chiyuoda-ku (JP)

(72) Inventors: Shun Saito, Chiyoda-ku (JP); Shuhei Ochi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 106 days.

(21) Appl. No.: 15/586,326

(22) Filed: May 4, 2017

(65) Prior Publication Data

US 2017/0233580 A1    Aug. 17, 2017

Related U.S. Application Data

(63) Continuation of application No. PCT/JP2015/085558, filed on Dec. 18, 2015.

(30) Foreign Application Priority Data

Dec. 25, 2014  (JP) .................. 2014-261511

(51) Int. Cl.
| | |
|---|---|
| *C09D 127/12* | (2006.01) |
| *C09D 4/00* | (2006.01) |
| *C09D 175/04* | (2006.01) |
| *C08G 18/62* | (2006.01) |
| *C08G 18/81* | (2006.01) |
| *C08G 18/24* | (2006.01) |
| *C09D 175/14* | (2006.01) |
| *C09D 127/22* | (2006.01) |
| *C08F 214/24* | (2006.01) |

(52) U.S. Cl.
CPC ............ *C09D 4/00* (2013.01); *C08G 18/242* (2013.01); *C08G 18/6279* (2013.01); *C08G 18/8116* (2013.01); *C08G 18/8125* (2013.01); *C08G 18/8175* (2013.01); *C09D 127/12* (2013.01); *C09D 127/22* (2013.01); *C09D 175/04* (2013.01); *C09D 175/14* (2013.01); *C08F 214/247* (2013.01)

(58) Field of Classification Search
CPC ...... C08G 18/00; C08G 18/06; C08G 18/242; C08G 18/62; C08G 18/6279; C08G 18/6275; C08G 18/63; C08G 18/638; C08G 18/8116; C08G 18/1825; C08G 18/1827; C09D 4/00; C09D 127/12; C09D 127/22; C09D 175/04; C09D 175/14; C08F 214/247
See application file for complete search history.

(56) References Cited

U.S. PATENT DOCUMENTS

2016/0347042 A1*  12/2016  Walker, Jr. ............... B32B 7/00

FOREIGN PATENT DOCUMENTS

| JP | 62-25104 | 2/1987 |
|---|---|---|
| JP | 64-51418 | 2/1989 |
| JP | 2005-290133 | 10/2005 |
| JP | 2008-156609 | 7/2008 |
| JP | 2012-167226 | 9/2012 |
| WO | WO 2008/093776 A1 | 8/2008 |
| WO | WO 2011/065154 A1 | 6/2011 |

OTHER PUBLICATIONS

English Translation of International Search Report dated Feb. 2, 2016 in PCT/JP2015/085558, filed Dec. 18, 2015.

* cited by examiner

*Primary Examiner* — Sanza L. McClendon
(74) *Attorney, Agent, or Firm* — Oblon, McClelland, Maier & Neustadt, L.L.P.

(57) ABSTRACT

Provided is a curable resin composition capable of forming a coating film excellent in the weather resistance and the impact resistance with a high productivity even on a member having a complicated shape for outdoor use. The curable resin composition contains a fluorinated copolymer (A) and a compound (B). The fluorinated copolymer (A) includes a fluorinated copolymer having a unit derived from a fluoroolefin, a unit having an ethylenic unsaturated group in its side chain, and a unit having a functional group, and the unit having a functional group is at least one member selected from a unit having a hydroxy group, a unit having a carboxy group and a unit having an alkoxysilyl group. The compound (B) includes at least one acryloyl group and/or methacryloyl groups and at least two isocyanate groups in one molecule.

15 Claims, No Drawings

CURABLE RESIN COMPOSITION

This application is a continuation of PCT Application No. PCT/JP2015/085558, filed on Dec. 18, 2015, which is based upon and claims the benefit of priority from Japanese Patent Application No. 2014-261511 filed on Dec. 25, 2014. The contents of those applications are incorporated herein by reference in their entireties.

TECHNICAL FIELD

The present invention relates to a curable resin composition.

BACKGROUND ART

Heretofore, as a curable resin composition employing a fluorinated copolymer, a curable resin composition containing a reaction product of a hydroxy group-containing fluorinated copolymer and an isocyanate group-containing acrylic monomer, and a monomer containing no fluorine atom, has been known (Patent Documents 1 to 3).

PRIOR ART DOCUMENTS

Patent Documents

Patent Document 1: WO2008/093776
Patent Document 2: JP-A-62-25104
Patent Document 3: JP-A-2012-167226

DISCLOSURE OF INVENTION

Technical Problem

The curable resin compositions in Patent Documents 1 to 3 have a high curing rate and are advantageous in view of the productivity. However, if they are applied to a substrate for outdoor use, they have the following problems. (1) A coating film is separated from the substrate by expansion/shrinkage by heat. (2) The coating film will have cracking by collision of e.g. sand. (3) The coating film is insufficient in the weather resistance by the influence of components derived from the monomer containing no fluorine atom in the coating film. (4) Only a flat substrate is applicable, and in the case of a substrate having a complicated shape, there is dispersion of the light irradiation intensity, and curing failure of the coating film may occur.

Under these circumstances, it is an objected of the present invention to provide a curable resin composition capable of forming a coating film excellent in the weather resistance and the impact resistance with a high productivity even on a member having a complicated shape for outdoor use.

Solution to Problem

The present invention has the following constructions.
[1] A curable resin composition containing the following fluorinated copolymer (A) and the following compound (B):
fluorinated copolymer (A): a fluorinated copolymer having a unit derived from a fluoroolefin, a unit having an ethylenic unsaturated group in its side chain, and a unit having a functional group, wherein the unit having a functional group is at least one member selected from a unit having a hydroxy group, a unit having a carboxy group and a unit having an alkoxysilyl group;
compound (B): a compound having an acryloyl group or methacryloyl group and at least two isocyanate groups in one molecule.
[2] The curable resin composition according to [1], wherein the fluoroolefin is tetrafluoroethylene or chlorotrifluoroethylene.
[3] The curable resin composition according to [1] or [2], wherein the ethylenic unsaturated group in the unit having an ethylenic unsaturated group in its side chain is a vinyl group, a vinyloxy group, an allyl group, an acryloyl group, a methacryloyl group, a maleoyl group, a styryl group or a cinnamoyl group.
[4] The curable resin composition according to any one of [1] to [3], wherein the ethylenic unsaturated group in the unit having an ethylenic unsaturated group in its side chain is a group introduced by reacting a fluorinated copolymer having a unit having a hydroxy group or a carboxy group with a compound having a functional group reactive with a hydroxy group or a carboxy group, and an ethylenic unsaturated group.
[5] The curable resin composition according to any one of [1] to [4], wherein the unit having a functional group is a unit having a hydroxy group derived from a monomer having a hydroxy group.
[6] The curable resin composition according to any one of [1] to [4], wherein the unit having a functional group is a unit having a carboxy group derived from a monomer having a carboxy group.
[7] The curable resin composition according to any one of [1] to [4], wherein the unit having a functional group is a unit having an alkoxysilyl group derived from a monomer having an alkoxysilyl group.
[8] The curable resin composition according to any one of [1] to [7], wherein the fluorinated copolymer (A) further has a unit having a hydrocarbon group other than the unit derived from a fluoroolefin, the unit having an ethylenic unsaturated group in its side chain and the unit having a functional group.
[9] The curable resin composition according to [8], wherein the unit having a hydrocarbon group is a unit derived from a monomer having a hydrocarbon group selected from a vinyl ether, an allyl ether and an unsaturated carboxylic acid ester.
[10] The curable resin composition according to any one of [1] to [9], which is a photocurable resin composition.
[11] The curable resin composition according to [10], which further contains a photoreaction initiator.
[12] The curable resin composition according to any one of [1] to [11], which further contains a pigment.

Advantageous Effects of Invention

According to the curable resin composition of the present invention, it is possible to form a coating film excellent in the weather resistance and the impact resistance with a high productivity even on a member having a complicated shape for outdoor use.

DESCRIPTION OF EMBODIMENTS

In this specification, a compound represented by the formula (1) will be referred to as "compound (1)". The same applies to compounds represented by other formulae.

A "monomer" means a compound having a carbon-carbon double bond capable of addition-polymerization.

A "unit" means a moiety derived from a monomer, formed by polymerization of the monomer. The unit may be a unit directly formed by a polymerization reaction of a monomer, or may be a unit having part of the unit converted to another structure by treating the polymer.

In this specification, a compound represented by $CH_2=CRC(=O)-OH$ (wherein R is a hydrogen atom or a methyl group) will be referred to as "(meth)acrylic acid". The "(meth)acrylic acid" generically means acrylic acid and methacrylic acid. An ester of (meth)acrylic acid will be referred to as "(meth)acrylate", and a group having a hydroxy group removed from (meth)acrylic acid will be referred to as "(meth)acryloyl group".

The curable resin composition of the present invention contains a fluorinated copolymer (A) and a compound (B) described hereinafter. Further, as the case requires, it may further contain a photoreaction initiator. Further, as the case requires, it may contain a reactive diluent, a pigment or other component.

[Fluorinated copolymer (A)]

The fluorinated copolymer (A) has a unit derived from a fluoroolefin (hereinafter sometimes referred to as "unit ($\alpha$1)"), a unit having an ethylenic unsaturated group in its side chain (hereinafter sometimes referred to as "unit ($\alpha$2)"), and a unit having a functional group (hereinafter sometimes referred to as "unit ($\alpha$3)"). The unit ($\alpha$3) is at least one member selected from a unit having a hydroxy group (hereinafter sometimes referred to as "unit ($\alpha$3-1)"), a unit having a carboxy group (hereinafter sometimes referred to as "unit ($\alpha$3-2)"), and a unit having an alkoxysilyl group (hereinafter sometimes referred to as "unit ($\alpha$3-3)").

The fluorinated copolymer (A) may further have a unit other than the units ($\alpha$-1) to ($\alpha$-3) (hereinafter sometimes referred to as "unit ($\alpha$-4)").

(Unit ($\alpha$1))

The unit ($\alpha$1) is a unit derived from a fluoroolefin.

The fluoroolefin is a compound having at least one hydrogen atom in an olefin hydrocarbon (the formula: $C_nH_{2n}$) substituted by a fluorine atom.

The number of carbon atoms in the fluoroolefin is preferably from 2 to 8, more preferably from 2 to 6, most preferably 2 or 3.

The number of fluorine atoms in the fluoroolefin is preferably at least 2, more preferably from 3 to 4. When the number of fluorine atoms is at least 2, the weather resistance of the obtainable coating film will improve. In the fluoroolefin, at least one hydrogen atom not substituted by a fluorine atom may be substituted by a chlorine atom.

The fluoroolefin is preferably at least one member selected from the group consisting of tetrafluoroethylene, chlorotrifluoroethylene, hexafluoropropylene, vinylidene fluoride and vinyl fluoride, more preferably tetrafluoroethylene or chlorotrifluoroethylene.

The fluorinated copolymer (A) may contain at least two types of the unit ($\alpha$1).

The unit ($\alpha$1) is preferably a unit directly formed by polymerizing a fluoroolefin.

(Unit ($\alpha$2))

The unit ($\alpha$2) is a unit having an ethylenic unsaturated group in its side chain.

By the fluorinated copolymer (A) having an ethylenic unsaturated group, for example, a curing reaction will proceed by light irradiation in the presence of a photoreaction initiator described hereinafter. An ethylenic unsaturated group has high reactivity and provides a high curing rate. Further, it will not be influenced by work environment (particularly moisture) at the time of application and curing. Accordingly, the time from application until completion of curing can be shortened, and an excellent productivity will be achieved. Further, the coating material composition may be formed into one liquid, and the coating material composition will not be thickened during application, whereby favorable curtain flow properties will be achieved. Further, unlike the curing reaction by heat, no cooling step is necessary, and accordingly when a coating film is to be formed on a glass substrate for example, the glass substrate will not be broken by quenching.

The ethylenic unsaturated group is preferably a vinyl group, a vinyloxy group, an allyl group, a (meth)acryloyl group, a maleoyl group, a styryl group or a cinnamoyl group in that curing by light or heat will quickly proceed, more preferably a (meth)acryloyl group. In the fluorinated copolymer (A) to be used for the photocurable resin composition, the ethylenic unsaturated group is particularly preferably an acryloyl group.

The unit ($\alpha$2) is preferably a unit obtained by chemically converting a unit having a functional group such as a hydroxy group or a carboxy group to a unit having an ethylenic unsaturated group.

As a method of introducing an ethylenic unsaturated group by chemical conversion of a unit having a functional group, preferred is a method of obtaining a precursor copolymer of the fluorinated copolymer (A), having a hydroxy group or a carboxy group, and reacting the precursor copolymer with a compound having a functional group reactive with a functional group of the precursor copolymer, and an ethylenic unsaturated group. Specifically, the following methods (1) to (8) are preferred.

(1) A precursor copolymer having a hydroxy group is reacted with a carboxy compound having an ethylenic unsaturated group (for example, JP-A-2005-139363).

(2) A precursor copolymer having a hydroxy group is reacted with an isocyanate compound having an ethylenic unsaturated group (for example, JP-A-62-25104).

(3) A precursor copolymer having a hydroxy group is reacted with (meth)acryloyl chloride (for example, JP-A-64-51418).

(4) A precursor copolymer having a hydroxy group is reacted with maleic anhydride (for example, JP-A-59-41315).

(5) A precursor copolymer having a hydroxy group is reacted with a vinyl ether compound or a vinyl ester compound (for example, JP-A-2001-220364).

(6) A precursor copolymer having a hydroxy group is reacted with (meth)acrylic anhydride.

(7) A precursor copolymer having a carboxy group is reacted with an epoxy compound having an ethylenic unsaturated group (for example, JP-A-5-279435).

(8) A precursor copolymer having a carboxy group is reacted with a (meth)acrylate compound having a vinyl ether group (JP-A-2005-202134).

As a monomer having a hydroxy group used for producing the precursor copolymer having a hydroxy group, the same monomer as a monomer to form a unit ($\alpha$3-1) described hereinafter may be used.

Further, as a monomer having a carboxy group used for polymerization of the precursor copolymer having a carboxy group, the same monomer as a monomer to form a unit ($\alpha$3-2) described hereinafter may be used.

(Unit ($\alpha$3))

The unit ($\alpha$3) is a unit ($\alpha$3-1), a unit ($\alpha$3-2) or a unit ($\alpha$3-3). The fluorinated copolymer (A) may contain at least two types of such units.

As the unit (α3), at least a part thereof is preferably the unit (α3-1).

Unit (α3-1):

The unit (α3-1) is a unit having a hydroxy group.

As a monomer to form the unit (α3-1), a hydroxyalkyl vinyl ether such as 2-hydroxyethyl vinyl ether, 3-hydroxypropyl vinyl ether or 4-hydroxybutyl vinyl ether; an ethylene glycol monovinyl ether such as diethylene glycol monovinyl ether; a hydroxyalkyl allyl ether such as hydroxyethyl allyl ether; a vinyl hydroxyalkylcarboxylate; an allyl hydroxyalkylcarboxylate; or a hydroxyalkyl (meth)acrylate such as hydroxyethyl (meth)acrylate may, for example, be mentioned. As such a monomer, one type may be used alone, or two or more types may be used in combination.

In a case where the unit derived from the monomer having a hydroxy group is chemically converted after polymerization, the unit (α3-1) is obtained by leaving a part of the unit derived from the monomer having a hydroxy group without chemical conversion after polymerization.

Unit (α3-2):

The unit (α3-2) is a unit having a carboxy group.

As a monomer to form the unit (α3-2), an unsaturated carboxylic acid such as 10-undecenoic acid, (meth)acrylic acid, vinyl acetate, crotonic acid or cinnamic acid; a saturated carboxylic acid vinyl ether such as vinyloxyvaleric acid, 3-vinyloxypropionic acid, 3-(2-vinyloxybutoxycarbonyl)propionic acid or 3-(2-vinyloxyethoxycarbonyl)propionic acid; a saturated carboxylic acid allyl ether such as allyloxyvaleric acid, 3-allyloxypropionic acid, 3-(2-allyloxybutoxycarbonyl)propionic acid or 3-(2-allyloxyethoxycarbonyl)propionic acid; a vinyloxy group-containing carboxylic acid such as 3-(2-vinyloxyethoxycarbonyl) propionic acid or 3-(2-vinyloxybutoxycarbonyl)propionic acid; a saturated polyvalent carboxylic acid monovinyl ester such as monovinyl adipate, monovinyl succinate, vinyl phthalate or vinyl pyromellitate; an unsaturated dicarboxylic acid such as itaconic acid, maleic acid or fumaric acid; or an unsaturated dicarboxylic acid monoester such as itaconic acid monoester, maleic acid monoester or fumaric acid monoester may, for example, be mentioned. As such a monomer, one type may be used alone, or two or more types may be used in combination.

Further, a unit derived from an unsaturated dicarboxylic acid anhydride such as maleic anhydride or itaconic anhydride may be chemically converted to form a unit having a carboxy group.

In a case where the unit derived from the monomer having a carboxy group is chemically converted after polymerization, the unit (α3-2) is obtained by leaving a part of the unit derived from the monomer having a carboxy group without chemical conversion after polymerization.

Unit (α3-3):

The unit (α3-3) is a unit having an alkoxysilyl group.

The unit (α3-3) may be a unit derived from a monomer having an alkoxysilyl group. Further, the unit (α3-3) may be a unit obtained by chemically converting a unit having a functional group such as a hydroxy group or a carboxy group to a unit having an alkoxysilyl group.

As a monomer to form the unit (α3-3), an alkoxysilylalkyl (meth)acrylate such as $CH_2=CHCO_2(CH_2)_3Si(OCH_3)_3$, $CH_2=CHCO_2(CH_2)_3Si(OC_2H_5)_3$, $CH_2=C(CH_3)CO_2(CH_2)_3Si(OCH_3)_3$, $CH_2=C(CH_3)CO_2(CH_2)_3Si(OC_2H_5)_3$, $CH_2=CHCO_2(CH_2)_3SiCH_3(OC_2H_5)_2$, $CH_2=C(CH_3)CO_2(CH_2)_3SiC_2H_5(OCH_3)_2$, $CH_2=C(CH_3)CO_2(CH_2)_3Si(CH_3)_2(OC_2H_5)$, $CH_2=C(CH_3)CO_2(CH_2)_3Si(CH_3)_2OH$, $CH_2=CH(CH_2)_3Si(OCOCH_3)_3$, $CH_2=C(CH_3)CO_2(CH_2)_3SiC_2H_5(OCOCH_3)_2$, $CH_2=C(CH_3)CO_2(CH_2)_3SiCH_3(N(CH_3)COCH_3)_2$, $CH_2=CHCO_2(CH_2)_3SiCH_3[ON(CH_3)C_2H_5]_2$ or $CH_2=C(CH_3)CO_2(CH_2)_3SiC_6H_5[ON(CH_3)C_2H_5]_2$; a vinylsilane such as $CH_2=CHSi[ON=C(CH_3)(C_2H_5)]_3$, $CH_2=CHSi(OCH_3)_3$, $CH_2=CHSi(OC_2H_5)_3$, $CH_2=CHSiCH_3(OCH_3)_2$, $CH_2=CHSi(OCOCH_3)_3$, $CH_2=CHSi(CH_3)_2(OC_2H_5)$, $CH_2=CHSi(CH_3)_2SiCH_3(OCH_3)_2$, $CH_2=CHSiC_2H_5(OCOCH_3)_2$, $CH_2=CHSiCH_3[ON(CH_3)C_2H_5]_2$, vinyl trichlorosilane or a partial hydrolysate thereof; or an alkoxysilylalkyl vinyl ether such as trimethoxysilylethyl vinyl ether, triethoxysilylethyl vinyl ether, trimethoxysilylbutyl vinyl ether, methyldimethoxysilylethyl vinyl ether, trimethoxysilylpropyl vinyl ether or triethoxysilylpropyl vinyl ether may, for example, be mentioned.

The unit (α3-3) is preferably a unit obtained by reacting a compound having a functional group reactive with a hydroxy group, and an alkoxysilyl group, with the unit (α3-1).

The functional group reactive with a hydroxy group may be an isocyanate group, a carboxy group or a reactive derivative group thereof, or an epoxy group. Among them, an isocyanate group is preferred.

As a compound having an isocyanate group and an alkoxysilyl group, a compound represented by the following formula (1) may be mentioned.

$$OCN(CH_2)_qSiX_pR^1_{3-p} \quad (1)$$

wherein $R^1$ is a hydrogen atom or a $C_{1-10}$ monovalent hydrocarbon group, X is a $C_{1-5}$ alkoxy group, p is an integer of from 1 to 3, and q is an integer of from 1 to 5.

The fluorinated copolymer (A) having the unit (α3-3) may be obtained by reacting a precursor copolymer having a hydroxy group with the compound (1) in a solvent having no active hydrogen reactive with the isocyanate group of the compound (1) (for example, ethyl acetate, methyl ethyl ketone or xylene).

By the reaction of the hydroxy group in the unit (α3-1) in the precursor copolymer having a hydroxy group with the isocyanate group of the compound (1), a urethane bond (—NHC(=O)—) is formed, and the unit (α3-1) is chemically converted to the unit (α3-3).

The compound (1) may, for example, be specifically 3-isocyanatepropyltrimethoxysilane, 3-isocyanatepropyltriethoxysilane, 3-isocyanatepropylmethyldimethoxysilane, 3-isocyanatepropylmethyldiethoxysilane, 3-isocyanatepropyldimethylmethoxysilane, 3-isocyanatepropyldimethylethoxysilane, 4-isocyanatebutyltrimethoxysilane, 4-isocyanatebutyltriethoxysilane, 2-isocyanateethyltrimethoxysilane or 2-isocyanateethyltriethoxysilane.

The compound (1) is preferably 3-isocyanatepropyltrimethoxysilane or 3-isocyanatepropyltriethoxysilane in view of availability.

As the compound (1), one type may be used alone, or two or more types may be used in combination.

Further, the unit (α3-3) may be a unit obtained by reacting a compound having a functional group reactive with a carboxy group, and an alkoxysilyl group, with the unit (α3-2) in a precursor copolymer having a carboxy group.

The functional group reactive with a carboxy group may be an isocyanate group or an epoxy group. Among them, an isocyanate group is preferred.

Unit (α4):

The unit (α4) is a unit other than the units (α1) to (α3), and is preferably a unit having no fluorine atom nor functional group. As a monomer to form the unit (α4), a vinyl ether, an allyl ether, an unsaturated carboxylic acid ester, a saturated carboxylic acid vinyl ester or an olefin may be mentioned. Particularly, a vinyl ether, an allyl ether or an unsaturated carboxylic acid ester, having a hydrocarbon group such as an alkyl group, a cycloalkyl group or an aryl group, is preferred. The number of carbon atoms in the hydrocarbon group is preferably at most 12. As a monomer having a hydrocarbon group, an alkyl vinyl ether, an alkyl allyl ether, an alkyl (meth)acrylate, a cycloalkyl vinyl ether or a cycloalkyl allyl ether may, for example, be mentioned.

The proportion of the unit (α1) in the fluorinated copolymer (A) is preferably from 20 to 80 mol %, more preferably from 30 to 70 mol %, further preferably from 40 to 60 mol %.

The proportion of the unit (α2) in the fluorinated copolymer (A) is preferably from 0.1 to 70 mol %, more preferably from 0.2 to 60 mol %, further preferably from 0.3 to 50 mol %.

The proportion of the unit (α3) in the fluorinated copolymer (A) is preferably from 0.1 to 70 mol %, more preferably from 0.2 to 60 mol %, further preferably from 0.3 to 50 mol %.

The proportion of the unit (α4) in the fluorinated copolymer (A) is preferably from 0.1 to 70 mol %, more preferably from 0.2 to 60 mol %, further preferably from 0.3 to 50 mol %.

The mass average molecular weight (Mw) of the fluorinated copolymer (A) is preferably from 3,000 to 600,000, more preferably from 3,500 to 300,000, further preferably from 4,000 to 200,000.

When the mass average molecular weight (Mw) of the fluorinated copolymer (A) is at least the lower limit value in the above preferred range, the coating film hardly have wrinkles at the time of curing. Further, when it is at most the upper limit value in the above preferred range, the viscosity of the coating material composition tends to be kept low, and favorable application workability will be achieved.

[Compound (B)]

The compound (B) is a compound having a (meth) acryloyl group and having at least two isocyanate groups. The compound (B) is preferably a compound having at least two (meth)acryloyl groups and at least two isocyanate groups, more preferably a compound having two (meth) acryloyl groups and two isocyanate groups. For example, a compound represented by the following formula (2) may be used.

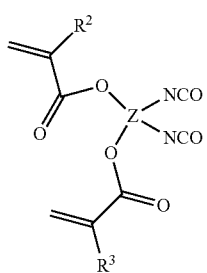

(2)

In the formula (2), $R^2$ and $R^3$ are hydrogen or an alkyl group, and Z is a tetravalent hydrocarbon group.

$R^2$ and $R^3$ are preferably hydrogen or a $C_{1-3}$ alkyl group, more preferably a $C_{1-12}$ alkyl group. $R^2$ and $R^3$ may be the same or different.

Z may be a tetravalent aliphatic hydrocarbon group. As the tetravalent aliphatic hydrocarbon group, a $C_{1-20}$ group is preferred, a $C_{1-16}$ group is more preferred, a $C_{1-12}$ group is further preferred, and further, a $C_{1-8}$ group or a $C_{1-4}$ group is preferred.

Z may be any of linear, branched or cyclic, and in view of the hardness, the strength and the chemical resistance of the coating film at the time of curing, Z is preferably cyclic.

The compound (2) may, for example, be Laromer LR9000 (tradename) manufactured by BASF.

The content of the compound (B) is preferably from 0.1 to 60 mass %, more preferably from 0.5 to 50 mass % based on the total amount of curable resin composition.

[Photoreaction Initiator]

In a case where the curable resin composition of the present invention is a photocurable resin composition, the curable resin composition usually contains a photoreaction initiator. The photoreaction initiator may be one which can initiate the curing reaction by light irradiation, and is preferably a radical polymerization initiator. Such a photoreaction initiator may, for example, be an acetophenone, a benzoin, a benzophenone, a phosphine oxide, a ketal, an anthraquinone, a thioxantone, an azo compound, a peroxide, a 2,3-dialkyldione compound, a disulfide compound, a fluoroamine compound or an aromatic sulfonium.

The acetophenone may, for example, be 2,2-diethoxyacetophenone, p-dimethylacetophenone, 1-hydroxydimethyl phenyl ketone, 1-hydroxy-cyclohexyl-phenyl-ketone, 2-methyl-1-(4-methylthiophenyl)-2-morpholinopropan-1-one, or 2-benzyl-2-dimethylamino-1-(4-morpholinophenyl)-butanone.

The benzoin may, for example, be a benzoin benzene sulfonic acid ester, a benzoin toluene sulfonic acid ester, benzoin methyl ether, benzoin ethyl ether or benzoin isopropyl ether.

The benzophenone may be benzophenone, 2,4-dichlorobenzophenone, 4,4-dichlorobenzophenone or p-chlorobenzophenone.

The phosphine oxide may be 2,4,6-trimethylbenzoyl diphenylphosphine oxide.

In combination with such a photoradical polymerization initiator, a sensitizing dye may also be preferably used.

As the photoreaction initiator, one type may be used alone, or at least two types may be used in combination.

The content of the photoreaction initiator is preferably from 0.05 to 25 parts by mass, more preferably from 0.1 to 10 parts by mass, particularly preferably from 0.3 to 5 parts by mass per 100 parts by mass of the total amount of the fluorinated copolymer (A) and the compound (B).

When the content of the photoreaction initiator is at least the lower limit value, the sensitivity of the photoreaction initiator tends to be secured, and curing of the coating layer will readily proceed sufficiently with a small light irradiation energy in a short time. Further, when the content of the photoreaction initiator (C) is at most the above upper limit value, remaining of an unreacted photoreaction initiator in the coating film, which may lead to a decrease in the physical property of the coating film or coloring of the coating film, tends to be suppressed. Further, the amount of the photoreaction initiator is small, such being economically efficient.

[Reactive Diluent]

The curable resin composition of the present invention preferably contains, in addition to the fluorinated copolymer (A), the compound (B) and the photoreaction initiator, a reactive diluent.

The reactive diluent is a compound which has a low viscosity and which has at least one (preferably at least 2, further preferably 2) ethylenic unsaturated group in one molecule. The reactive diluent contributes to dilution of a coating material composition like a solvent, and forms a part of the coating film by reaction with the fluorinated copolymer (A) at the time of curing, since it has an ethylenic unsaturated group. Further, in a case where it has at least 2 ethylenic unsaturated groups, it functions as a crosslinking agent and contributes to formation of a cured coating film.

The reactive diluent preferably has a viscosity of at most 1 Pa·s as measured by a rotary viscometer at 25° C.

By the curable resin composition containing the reactive diluent, application workability of the curable resin composition will improve and in addition, the hardness, the chemical resistance, the impact resistance, the moisture resistance, the breaking strength, the elongation, etc. of the coating film tend to be adjusted. Particularly with respect to the moisture resistance, the crosslink density of the coating film will increase by the reaction of the reactive diluent, and infiltration of moisture can be further decreased.

The reactive diluent is preferably a non-fluorinated compound having at least two ethylenic unsaturated groups in one molecule. As the group having an ethylenic unsaturated group, a (meth)acryloyloxy group is preferred, and for the reactive diluent in the photocurable resin composition, an acryloyloxy group is more preferred. The reactive diluent may, for example, be specifically a poly(meth)acrylate of a polyhydric alcohol.

The content of the reactive diluent is preferably from 0.5 to 60.0 mass %, more preferably from 1.0 to 50.0 mass % based on the total amount of the photocurable resin composition. When the content of the reactive diluent is at least the above lower limit value, effects by the reactive diluent are likely to be obtained. When the content of the reactive diluent is at most the above upper limit value, the weather resistance of the coating film will hardly decrease.

[Pigment]

The curable resin composition of the present invention preferably contains a pigment for the purpose of corrosion prevention, coloring, reinforcing, etc. of the coating film.

The pigment is preferably at least one pigment selected from the group consisting of a rust-preventing pigment, a coloring pigment and an extender pigment.

The rust-preventive pigment is a pigment to prevent corrosion or modification of a reflecting mirror. A lead-free rust-preventive pigment is preferred in view of less impact on the environment. The lead-free rust-preventive pigment may, for example, be zinc cyanamide, zinc oxide, zinc phosphate, calcium magnesium phosphate, zinc molybdate, barium borate or zinc calcium cyanamide.

The coloring pigment is a pigment for coloring the coating film. The coloring pigment may, for example, be titanium oxide, carbon black or iron oxide. In a case where a titanium oxide pigment is used, for the purpose of further improving the weather resistance of the coating film, preferred is one surface-treated e.g. with cerium for suppressing the photocatalytic action. Particularly preferred is D918 (tradename, manufactured by Sakai Chemical Industry Co., Ltd.) or PFC 105 (tradename, manufactured by Ishihara Sangyo Kaisha, Ltd.).

The extender pigment is a pigment to improve the hardness and to increase the thickness of the coating film. The extender pigment may, for example, be talc, barium sulfate, mica or calcium carbonate.

The pigment component is particularly preferably titanium oxide in view of excellent weather resistance.

The content of the pigment component is preferably from 10 to 500 parts by mass, more preferably from 30 to 400 parts by mass per 100 parts by mass of the solid content other than the pigment in the curable resin composition. When the content of the pigment component is at least the above lower limit value, the function of the pigment component is likely to be obtained. When the content of the pigment component is at most the above upper limit value, the coating film will hardly be scarred even when collided with sand or the like, and the weather resistance of the coating film will improve.

[Other Component]

The curable resin composition of the present invention may contain a component other than the above-described respective components. Other component may, for example, be a photosensitizer, an organic solvent, a curing agent, an antioxidant, a heat-curing catalyst, a rheology controlling agent, an anticorrosive agent, a leveling agent, a defoaming agent, a surfactant, an antifouling agent, a silane coupling agent, a matting agent, an antistatic agent, a hydrophilizing agent, a water repellent, or a resin other than the fluorinated copolymer (A).

In a case where the curable resin composition of the present invention is a photocurable resin composition, it preferably contains a photostabilizer. The photostabilizer may, for example, be an anthracene compound, a pyrene compound, a carbonyl compound, an organic sulfur compound, a persulfide, a redox compound, an azo or diazo compound, a halogen compound or a photoreducing dye. Two or more of them may be used as mixed.

The photosensitizer is preferably contained in an amount of from 0.001 to 10 mass % based on the total amount of the curable resin composition.

The resin other than the fluorinated copolymer (A) may, for example, be a non-fluororesin such as an acrylic resin, a polyester resin, an acrylic polyol resin, a polyester polyol resin, a urethane resin, an acrylic modified silicon resin, a silicone modified acrylic resin, a silicone resin, an alkyd resin, an epoxy resin, an oxetane resin or an amino resin, or a fluororesin other than the fluorinated copolymer (A). Such other resin may be a curable resin having photoreactive crosslinking groups.

In a case where other resin is incorporated in the curable resin composition of the present invention, the content of other resin is preferably from 1 to 100 parts by mass, more preferably from 3 to 90 parts by mass, further preferably from 5 to 80 parts by mass per 100 parts by mass of the fluorinated copolymer (A).

The curable resin composition of the present invention may be produced by mixing the fluorinated copolymer (A) and the compound (B), and as the case requires, an optional component such as the photoreaction initiator, the pigment or the reactive diluent. The order of mixing the respective components is not particularly limited. The viscosity of the composition is adjusted by a liquid component such as the reactive diluent, and in some cases, may be adjusted by an organic solvent.

[Formation of Coating Film]

As a method of applying the curable resin composition, a method of using e.g. a brush, a roller, a spray, a flow coater or an applicator may be mentioned. The amount of application of the curable resin composition may suitably be selected depending upon the desired film thickness.

In a case where the curable resin composition contains an organic solvent, the curable resin composition is applied to a substrate to form a coating film, and the organic solvent is removed from the coating film to obtain a coating film having the organic solvent removed (hereinafter sometimes referred to as a dry film).

In a case where the curable resin composition is a photocurable resin composition, then, the curable resin composition is cured by light irradiation to form a coating film. In a case where an organic solvent is used for the curable resin composition for the purpose of adjusting the viscosity, the organic solvent is removed from the coating layer e.g. by heating or pressure reduction, and the coating layer is cured by light irradiation to form a coating film.

The temperature when the organic solvent is removed is properly determined considering the boiling point of the solvent used, and is preferably from 15 to 100° C., more preferably from 20 to 80° C. When the temperature is at least the lower limit value, the organic solvent will readily be removed. When the temperature is at most the upper limit value, the coating film hardly have bubble marks.

The atmosphere at the time of light irradiation is not particularly limited, and the air or an inert gas atmosphere is preferred.

Light applied to the coating layer is preferably ultraviolet light, more preferably ultraviolet light having a wavelength of from 150 to 450 nm. As an ultraviolet irradiation source, a mercury lamp, a xenon lamp, a carbon arc, a metal halide lamp or the sun is preferred. Particularly in a case where light irradiation is carried out in the air, a high pressure mercury lamp is more preferred.

The light irradiation time is preferably at least 3 seconds, whereby the curing reaction will sufficiently proceed. Further, it is preferably at most 600 seconds in view of the productivity.

An apparatus used for curing by light irradiation is not particularly limited, and a curing apparatus such as a closed curing furnace or a tunnel kiln capable of continuous curing may be employed. Specifically, invertor conveyor "ECS-401 GX" manufactured by EYE GRAPHICS CO., LTD. or an ultraviolet irradiation apparatus "UVC-02516S1AA01" manufactured by USHIO INC. may, for example, be mentioned.

Further, in a case where the curable resin composition contains a heat-curing catalyst, curing may be accelerated by heating in addition to curing by light irradiation.

The heating method is not particularly limited, and a method by e.g. circulating hot air, infrared heating or high frequency heating may be employed.

The temperature and time conditions for curing by using a heat-curing catalyst vary depending upon the type of the heat-curing catalyst, and preferred is curing at 50 to 200° C. for from 10 seconds to 5 hours, more preferred is curing at from 50 to 150° C. for from 30 seconds to 1 hour.

The order of light irradiation to the coating layer and curing by heat curing is not particularly limited. In a case where heat curing is carried out first, the coating layer is partially cured by heat curing and then photo-curing is carried out. The film thickness of the cured coating film is preferably from 0.5 to 100 μm.

In a case where the curable resin composition of the present invention is a thermosetting resin composition containing a heat-curing catalyst such as a peroxide instead of the photoreaction initiator, curing may be conducted under the same curing conditions as the heat curing.

As a material of the member having a complicated shape for outdoor use, a metal material such as iron, aluminum, an aluminum alloy or stainless steel, a glass material, a film material or the like is preferred. Particularly, application to a film material which should not be heated is preferred.

[Function and Effects]

From the curable composition of the present invention, which contains the compound (B), a strongly crosslinked coating film is formed, and a cured coating film excellent in the weather resistance and the impact resistance can be obtained. It is considered that a sufficiently cured coating film is obtained not only by crosslinking by the ethylenic unsaturated groups which both the fluorinated copolymer (A) and the compound (B) have but also by crosslinking by the isocyanate groups of the compound (B).

Further, in the case of a conventional photocurable resin composition, curing failure may occur in some cases particularly with respect to a member having a complicated shape, due to uneven irradiation with light or a shaded portion. However, with the photocurable resin composition of the present invention, it is possible to form a coating film with a high productivity even on a member having a complicated shape for outdoor use. This is considered to be because the fluorinated copolymer (A) has the unit ($\alpha 3$) and the compound (B) has at least two isocyanate groups, whereby the compound (B) functions as a crosslinking agent for the fluorinated copolymer (A) and makes crosslinking at a shaded portion possible.

EXAMPLES

Now, the present invention will be described in further detail with reference to Examples and Comparative Examples. However, it should be understood that the present invention is by no means restricted to such specific Examples.

[Production of Fluorinated Copolymer (A-1)]

As a precursor copolymer having a hydroxy group, a xylene solution (non-volatile content: 60%, hydroxy value: 36 mgKOH/g) of a copolymer of chlorotrifluoroethylene (CTFE), cyclohexyl vinyl ether (CHVE), hydroxybutyl vinyl ether (HBVE) and 2-ethylhexyl vinyl ether (2EHVE) (CTFE units/CHVE units/HBVE units/2EHVE units: 50/26/9/15 (mol %)) was used.

Into a four-necked flask having a capacity of 300 ml equipped with a thermometer, a reflux condenser and a stirrer, 100 g of the precursor copolymer having a hydroxy group, 5.4 g of Karenz AOI (2-acryloyloxyethyl isocyanate, manufactured by SHOWA DENKO K.K., tradename), 0.05 g of tin 2-ethylhexanoate and xylene (25.4 g) were added, followed by reaction in a nitrogen atmosphere at 50° C. for 5 hours.

The molar ratio of the OH groups in the precursor copolymer to the NCO groups in Karenz AOI was 1:1.

The infrared absorption spectrum of the obtained solution was measured, whereupon no absorption peak was observed in the absorption band of an isocyanate group, and on the contrary, a high absorption peak is observed in the absorption band of a urethane bond, and thus formation of a fluorinated copolymer (A-1) having an acryloyl group in side chains of the precursor copolymer was confirmed. Then, by filtration, a xylene solution (non-volatile content: 50 mass %) of the fluorinated copolymer (A-1) was obtained.

By IR analysis, the fluorinated copolymer (A-1) had 10% of OH groups which the precursor copolymer had remaining unreacted.

Example 1

To 100.0 g of the obtained xylene solution (non-volatile content:50 mass %) of the obtained fluorinated copolymer (A-1), 5.0 g of Laromer LR9000 (manufactured by BASF, tradename), 0.8 g of IRGACURE 184 (1-hydroxy-cyclohexyl-phenyl-ketone, manufactured by BASF, tradename)

and 0.8 g of IRGACURE 907 (2-methyl-1-(4-methylthiophenyl)-2-morpholinopropan-1-one, manufactured by BASF, tradename) were added, followed by stirring by a paint shaker for 30 minutes. After stirring, filtration was conducted to obtain a curable resin composition (1) in Example 1.

Laromer LR9000 corresponds to the compound (B), and IRGACURE 184 and IRGACURE 907 correspond to the photoreaction initiator.

Comparative Example 1

To 100.0 g of the obtained xylene solution (non-volatile content: 50 mass %) of the fluorinated copolymer (A-1), 0.8 g of IRGACURE 184, 0.8 g of IRGACURE 907 and 6.7 g of trimethylolpropane were added, followed by stirring by a paint shaker for 30 minutes. After stirring, filtration was conducted to obtain a curable resin composition (2) in Comparative Example 1.

[Preparation of Test Plate (a)]

To the surface of a chromate-treated aluminum plate, the curable resin composition (1) or the curable resin composition (2) was applied so that the film thickness of the dry coating film would be 25 µm to form a coating layer, which was cured in a constant temperature chamber at 25° C. for 24 hours. Then, using a conveyor ultraviolet irradiation apparatus (manufactured by EYE GRAPHICS CO., LTD., tradename: invertor conveyor "ECS-401GX"), the coating layer was cured by irradiation with ultraviolet light (UV) to obtain a test plate (a) of each of the curable resin composition (1) and the curable resin composition (2).

[Preparation of Test Plate (b)]

To the surface of a chromate-treated aluminum plate, the curable resin composition (1) or the curable resin composition (2) was applied so that the film thickness of the dry coating film would be 40 µm to form a coating layer, which was cured in a constant temperature chamber at 25° C. for one week to obtain a test plate (b) of each of the curable resin composition (1) and the curable resin composition (2).

[Impact Resistance]

Using each test plate (a), the impact resistance test of the coating film was conducted in accordance with JIS K 5600-5-3 (2009), and the impact resistance was evaluated in accordance with the following standards. As falling-weight, DuPont type was employed, and the test was conducted under conditions of a weight mass of 500 g and a height of 50 cm. The results are shown in Table 1. ○: No breakage, damage or the like was confirmed on the coating film. x: Breakage, damage or the like was confirmed on the coating film.

[Accelerated Weather Resistance]

With respect to the test plate (a), by a sunshine weather meter (manufactured by Suga Test Instruments Co., Ltd.), accelerated weather resistance was evaluated, and the value after exposure for 5,000 hours and the initial value were compared to evaluate the weather resistance of the coating film, based on the following standards. The results are shown in Table 1. ○: Gloss retention of at least 60%. x: Gloss retention of less than 60%.

[Exposure Test]
(1) Gloss Retention

Each test plate (a) was installed outdoors in Naha-city, Okinawa prefecture, and the 60° specular glossiness of the coating film surface immediately before installation and the 60° specular glossiness of the coating film surface after 2 years were measured by using a gloss meter (manufactured by Nippon Denshoku Industries Co., Ltd., PG-1M) in accordance with JIS K 5600-4-7: 1999 (ISO 2813: 1994). The proportion of the glossiness after 3 years based on the glossiness immediately before installation being 100% was taken as the gloss retention (unit: %), and the weather resistance was evaluated based on the following standards. The results are shown in Table 1. ○: Gloss retention of at least 60%. x: Gloss retention of less than 60%.

(2) Color Difference (ΔE)

Each test plate (a) was installed outdoors in Naha-city, Okinawa prefecture, and the colorimetry of the coating film surface immediately before installation and the colorimetry on the coating film surface after 3 years were measured by a color difference meter (manufactured by Nippon Denshoku Industries Co., Ltd., SA4000) in accordance with JIS K 5600-4-5: 1999, and further, the color difference (ΔE) between before and after the test was calculated in accordance with JIS K 5600-4-6: 1999, and the weather resistance was evaluated based on the following standards. The results are shown in Table 1. ○: Color difference (ΔE) of at most 5.0. x: Color difference (ΔE) of higher than 5.0.

[Coating Film Curing Property when not Irradiated with Ultraviolet Light]
(1) Gel Content Ratio The test plate (b) was immersed in acetone for extraction from the coating film for 2 hours under reflux conditions.

The initial weight before extraction and the weight after extraction and drying were measured, and the gel content ratio was calculated in accordance with the following formula. The results are shown in Table 1. Gel content ratio (%)=(weight after extraction and drying)/(initial weight before extraction)=100

(2) Solvent Resistance

The coating film of each test plate (b) was rubbed 100 times with gauze impregnated with xylene, and the state of the coating film after rubbing was evaluated based on the following standards. The results are shown in Table 1. ○: No dissolution of coating film observed. x: Dissolution of coating film observed.

TABLE 1

|  |  | Example 1 | Comparative Example 1 |
|---|---|---|---|
| Curable resin composition |  | (1) | (2) |
| Impact resistance |  | ○ | x |
| Accelerated weather resistance |  | ○ | x |
| Exposure test | Gloss retention | ○ | x |
|  | Color difference | ○ | x |
| Coating film curing property when not irradiated with ultraviolet light | Gel content ratio (%) | 83.2 | Complete dissolution |
|  | Solvent resistance | ○ | x |

○: No dissolution of coating film observed.
x: Dissolution of coating film observed.

As evident from the results in Table 1, the curable resin composition (1) containing the compound (B) provides a coating film excellent in the impact resistance and the weather resistance. Further, even when not irradiated with light, a certain level or higher curing property was achieved. Accordingly, it is possible to form a coating film excellent in the weather resistance and the impact resistance, with a high productivity even on a member having a complicated shape for outdoor use.

What is claimed is:
1. A curable resin composition, comprising a fluorinated copolymer (A) and a compound (B),
wherein the fluorinated copolymer (A) comprises a unit derived from a fluoroolefin, a unit comprising an eth- ylenic unsaturated group in its side chain and a unit comprising a functional group, wherein the unit comprising a functional group is at least one member selected from the group consisting of a unit comprising a hydroxy group, a unit comprising a carboxy group, and a unit comprising an alkoxysilyl group;

wherein the fluorinated copolymer (A) comprises from 0.3 to 50 mol % of the unit comprising an ethylenic unsaturated group in its side chain; and wherein the compound (B) comprises at least two (meth) acryloyl groups and at least two isocyanate groups in one molecule.

2. The curable resin composition according to claim 1, wherein the fluoroolefin is tetrafluoroethylene or chlorotrifluoroethylene.

3. The curable resin composition according to claim 1, wherein the ethylenic unsaturated group in the unit comprising an ethylenic unsaturated group in its side chain is a vinyl group, a vinyloxy group, an allyl group, an acryloyl group, a methacryloyl group, a maleoyl group, a styryl group, or a cinnamoyl group.

4. The curable resin composition according to claim 1, wherein the ethylenic unsaturated group in the unit comprising an ethylenic unsaturated group in its side chain is a group introduced by reacting a fluorinated copolymer comprising a unit comprising a hydroxy group or a carboxy group with a compound comprising a functional group reactive with a hydroxy group or a carboxy group, and an ethylenic unsaturated group.

5. The curable resin composition according to claim 1, wherein the unit comprising a functional group comprises a hydroxy group derived from a monomer comprising a hydroxy group.

6. The curable resin composition according to claim 1, wherein the unit comprising a functional group comprises a carboxy group derived from a monomer comprising a carboxy group.

7. The curable resin composition according to claim 1, wherein the unit comprising a functional group comprises an alkoxysilyl group derived from a monomer comprising an alkoxysilyl group.

8. The curable resin composition according to claim 1, wherein the fluorinated copolymer (A) further comprises a unit comprising a hydrocarbon group other than the unit derived from a fluoroolefin, the unit comprising an ethylenic unsaturated group in its side chain and the unit comprising a functional group.

9. The curable resin composition according to claim 8, wherein the unit comprising a hydrocarbon group is a unit derived from a monomer comprising a hydrocarbon group selected from a vinyl ether, an allyl ether, and an unsaturated carboxylic acid ester.

10. The curable resin composition according to claim 1, which is a photocurable resin composition.

11. The curable resin composition according to claim 10, which further comprises a photoreaction initiator.

12. The curable resin composition according to claim 1, which further comprises a pigment.

13. The curable resin composition according to claim 1, wherein the compound (B) comprises two (meth)acryloyl groups and two isocyanate groups in one molecule.

14. The curable resin composition according to claim 1, wherein the fluorinated copolymer (A) is a polymer comprising from 0.3 to 8.1 mol % of a unit comprising an ethylenic unsaturated group in its side chain.

15. A curable resin composition comprising a fluorinated copolymer (A) and a compound (B), wherein the fluorinated copolymer (A) comprises a unit derived from a fluoroolefin, a unit comprising an ethylenic unsaturated group in its side chain, and a unit comprising a functional group, wherein the unit comprising a functional group is at least one unit selected from the group consisting of a unit comprising a carboxy group and a unit comprising an alkoxysilyl group, and wherein the compound (B) comprises an acryloyl group or a methacryloyl group and at least two isocyanate groups in one molecule.

* * * * *